FIG.I.

United States Patent Office 3,522,948
Patented Aug. 4, 1970

3,522,948
VARIABLE FLOW PATH SEAL
Archie N. MacCrum, Pittsburgh, Pa., assignor to Westinghouse Electric Corporation, Pittsburgh, Pa., a corporation of Pennsylvania
Filed May 16, 1968, Ser. No. 729,644
Int. Cl. F16j *15/40, 15/54*
U.S. Cl. 277—27          10 Claims

ABSTRACT OF THE DISCLOSURE

In a controlled leakage face type shaft seal the face plate is made from a corrosion-erosion resistant material and clamped to a holder with an O-ring seal disposed between the interfaces. The O.D. of the face plate extends beyond an O.D. of the holder so that the clamping action exerts a cantilever effect on the plate. The face plate is deformed with the O.D. of the holder acting as a fulcrum. Thus, at low pressures a flow path between the face plate and a seal runner is obtained which produces a desired leakage rate. As the pressure increases, the face plate is forced against the holder, thereby decreasing the flow path so that the desired leakage rate exists at high pressures as well as low pressures.

BACKGROUND OF THE INVENTION

This invention relates, generally, to devices for the sealing of fluids and, more particularly, to controlled leakage face type seals for movable members such as rotating shafts.

PRIOR ART

In controlled leakage shaft seals of the prior art, such as shown in Pat. No. 3,179,422, issued Apr. 10, 1962 to D. E. Phillips, the operation depends on the balance of pressure forces acting in the axial direction on a nonrotating seal ring mounted adjacent to a rotating collar on a pump shaft. The forces acting on the seal ring brought about by the pressures of the pump fluid acting on the faces of the seal ring are such that the ring, which is movable axially toward and away from the rotating collar on the shaft, is made to shift axially to vary the distance between the seal ring and the rotating collar, thereby varying the distance between the respective sealing surfaces. Thus, the leakage flow past the sealing surfaces tends to increase until the pressure in a backing chamber builds up to a point where the force acting on one face of the seal ring as a result of the built up pressure in the backing chamber balances the force of fluid pressure acting on the opposite face of the seal ring, thereby establishing a balanced or equilibrium condition of the seal ring. Therefore, in prior seals, the leakage rate is a function of pressure, flow path, and temperature. However, a seal should not be affected by thermal transients and should have a substantially constant leakage rate at all pressures and temperatures.

Accordingly, an object of this invention is to provide a controlled leakage face type seal having a flow path which changes with changes in pressures, thereby maintaining a substantially constant leakage rate through the seal.

Another object of the invention is to provide a seal which is not affected by thermal transients.

Other objects of the invention will be explained fully hereinafter or will be apparent to those skilled in the art.

SUMMARY OF THE INVENTION

In accordance with one embodiment of the invention, a seal ring assembly and a seal runner assembly each comprise a holder and a face plate. Each holder is made from a material having a high elastic modulus and a coefficient of thermal expansion similar to that of the face plate. Each face plate is made from a corrosion-erosion resistant material, and is clamped to the holder with Belleville springs mounted on the clamping bolts, and an O-ring seal disposed between the interfaces of the plate and the holder. The O.D. of the face plate extends beyond an O.D. of the holder, so that clamping the plate to the holder produces a force which exerts a cantilever effect on the plate. The face plate is deformed with the O.D. of the holder acting as a fulcrum. Thus, at low pressures a flow path is obtained which produces a required leakage rate. As the pressure increases, the face plate is forced against the holder, thereby decreasing the flow path so that a required leakage rate exists at high pressures as well as at low pressures.

BRIEF DESCRIPTION OF THE DRAWING

For a better understanding of the nature and objects of the invention, reference may be had to the following detailed description, taken in conjunction with the accompanying drawings, in which.

DESCRIPTION OF PREFERRED EMBODIMENT

Figure 1:
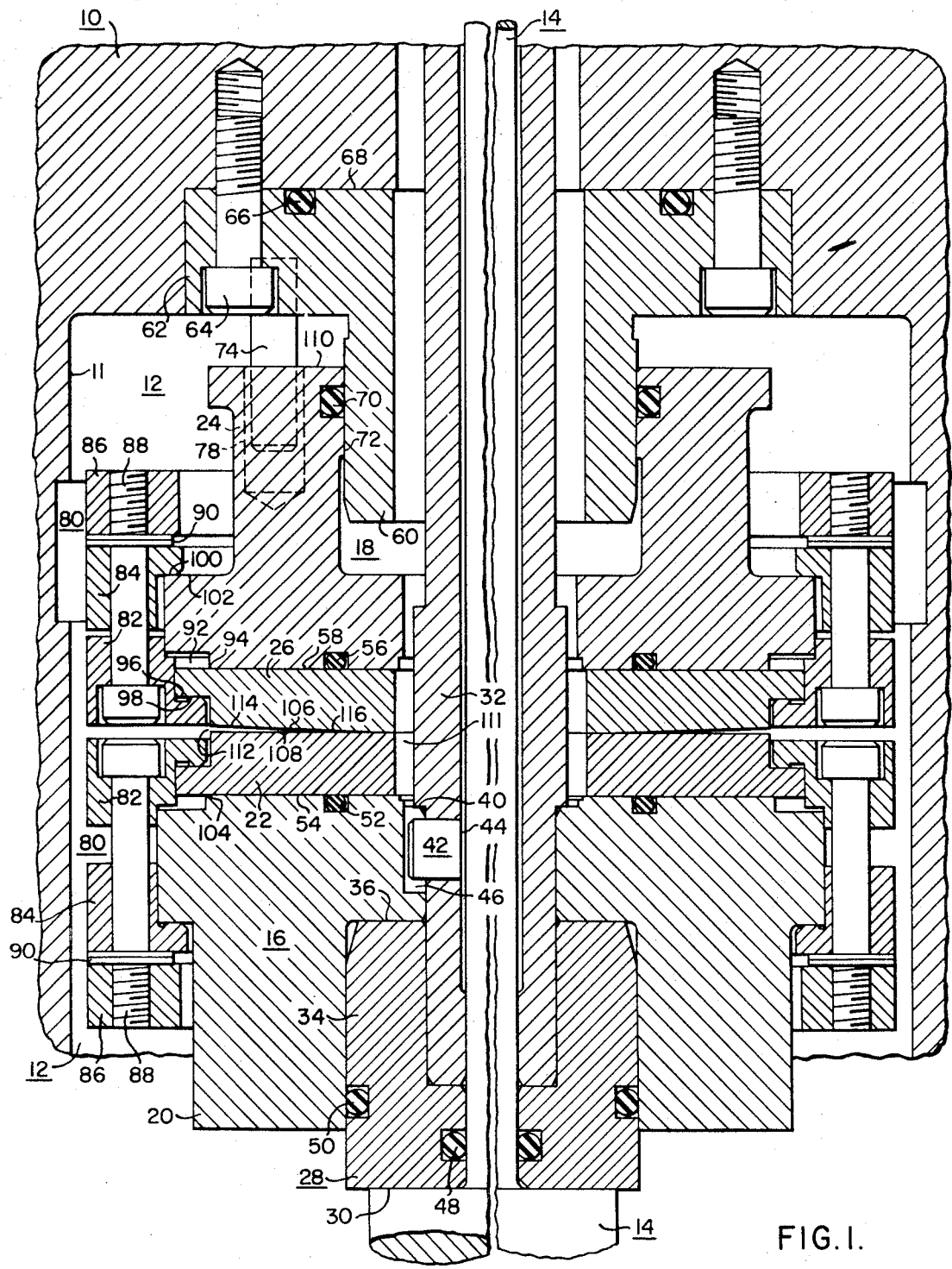
FIG. 1 is a view, in section, of a shaft seal arrangement embodying principal features of the invention.

Referring to the drawings, particularly to FIG. 1, the fluid seal arrangement shown therein may be generally of the type described in Pat. No. 3,347,552, issued Oct. 17, 1967 to Erling Frisch. The structure shown comprises a housing 10 having an annular wall 11 adapted to form a pressure chamber 12 within the housing 10, a shaft 14 rotatably mounted within the housing 10, a seal runner assembly 16, and a seal ring assembly 18 disposed within the housing 10. The shaft 14 may be driven by a suitable motor (not shown) and utilized to drive the impeller of a centrifugal pump (not shown) which circulates a fluid in a pressurized system. Injection water may be supplied to the chamber 12 at a higher pressure than that developed by the pump. The runner assembly 16 comprises an annular holder 20 and an annular seal plate 22. Likewise, the seal ring assembly 18 comprises an annular holder 24 and an annular face plate 26.

The holder 20 rotates with the shaft 14 since it is mounted on an annular support 28 which engages a shoulder 30 on the shaft 14 and is secured to the shaft by means of a sleeve 32 which is assembled onto the shaft 14 between the shaft and an upwardly extending leg 34 of the support 28 which is generally L-shaped in cross section. A shoulder 36 on the holder 20 rests on the upper end of the leg 34, and a shoulder 40 on the sleeve 32 retains the holder 20 on the support 28. A pin 42 is pressed into a recess 44 in the sleeve 32 and engages an axial slot 46 in the holder 20. An axial clamping force is exerted on the sleeve 32 and the support 28 from a nut (not shown) which causes the sleeve 32 and the support 28 to rotate with the shaft 14. The pin 42, in turn, causes the holder 20 to rotate with the sleeve 32 which rotates with the shaft. O-ring seals 48 and 50 are provided between the support 28 and the shaft 14 and the holder 20, respectively. An O-ring seal 52 is provided in the interface 54 between the holder 20 and the face plate 22.

The face plate 2 is composed of a corrosion-erosion resistant material having substantially the same coefficient of thermal expansion as the material of which the holder 20 is composed, the holder has a high elastic modulus. Likewise, the face plate 26 is composed of a corrosion-erosion resistant material having substantially the same coefficient of thermal expansion as the material of the holder 24 which has a high elastic modulus. Examples of suitable materials are carbides and ceramics. An O-ring seal 56 is provided in the interface 58 between the holder 24 and the face plate 26.

The holder 24 is movably mounted on a downwardly extending leg 60 of an annular seal ring insert 62 which is generally L-shaped in cross section. The insert 62 is retained in the housing 10 by cap screws 64. An O-ring seal 66 is provided in the interface 68 between the insert 62 and the housing 10. Likewise, an O-ring seal 70 is provided in the interface 72 between the holder 24 and the leg 60 of the insert 62. Rotative movement of the holder 24 is prevented by a pin 74 which is pressed into the insert 62. The pin 74 extends into a well 78 in the holder 24 with sufficient clearance between the wall of the well 78 and the pin 74 to permit axial movement of the holder 24, but limit rotative movement of the holder 24.

The face plate 26 is attached to the holder 24 by clamping means 80 which includes a retainer ring 82, a clamp ring 84, a lock ring 86, a plurality of cap screws 88, and Belleville springs 90 mounted on the cap screws 88 between the lock ring 86 and the clamp ring 84. The cap screws 88 extend through the retainer ring 82, the clamp ring 84, the Belleville springs 90 and are threaded into the lock ring 86. The interface 58 of the holder 24 is recessed at 92 to provide an annular fulcrum 94 on the interface at an outside diameter which is less than the outside diameter of the interface of the face plate 26. The retainer 82 has an inwardly extending flange with a ridge 98 which engages the portion 96 of the face plate 26 extending beyond the fulcrum 94. The clamp ring 84 has an inwardly extending flange with a ridge 100 which engages a face 102 on the holder 24. Thus, when the cap screws 88 are tightened to draw the clamp ring 84 and the retainer ring 82 towards each other, a force is produced which exerts a cantilever effect on the face plate 26 about the fulcrum 94. During the clamping action the Belleville springs 90 are partly compressed and the face plate 26 is deformed by the clamping force.

The face plate 22 is attached to the holder 20 by clamping means 80 in a manner similar to that described with reference to the face plate 26. However, the fulcrum 104 on the interface 54 of the holder 20 is located closer to the outside diameter of the face plate 22 than is the fulcrum 94 on the holder 24. Thus, the clamping force on the face plate 22 does not produce as much deformation of the plate about the fulcrum 104 as is produced on the face plate 26. If desired, the fulcrums 94 and 104 may be placed at the same locations with respect to their corresponding face plates.

As previously described, the seal ring assembly 18 is mounted for limited axial movement relative to the shaft 14 and the seal runner assembly 16. Also, rotative movement of the seal ring assembly 18 is limited by the antirotational pin 74 which fits loosely in the well 78 in the seal ring holder 24. A seal face 106 on the face plate 26 is biased toward a confronting seal face 108 on the face plate 22 by gravity.

As explained in the aforesaid patent, during operation of the pump driven by the shaft 14, surfaces 102 and 110 of the seal ring holder 24 are subjected to the full pressure in the high pressure chamber 12. It is desirable to provide a pressure barrier between the high pressure chamber 12 and an annular low pressure region 111 adjacent the sleeve 32. The seal ring assembly 18 is utilized as the pressure barrier means, but permits a controlled amount of fluid leakage flow to the region 111 from the pressure chamber 12 through a seal gap 112 provided between the confronting sealing faces 106 and 108 on the seal plates 26 and 22, respectively.

During operation, a balanced or equilibrium position of the axially movable seal ring assembly 18 is maintained in accordance with the pressure on opposing faces of the seal ring assembly. The thickness of the fluid in the gap 112 and, consequently, the amount of leakage flow through the gap 112 is determined by the configuration of the gap 112.

In order to obtain a self-restoration of the relative position of the seal ring assembly 18 and the runner assembly 16 upon a variation in the seal gap 112, a fluid flow path of decreasing thickness is provided from a high pressure edge or extremity 114 to a position between the seal face extremities. More specifically, in the structure illustrated, the fluid flow path of decreasing thickness extends between the outer edge 114 and an intermediate concentric circle located at 116 on the sealing face 106.

As shown in the present structure, the decreasing flow path thickness is formed by tapering the surface 106 slightly away from the confronting surface 108 of the face plate 2 between the circle 116 and the outer edge 114 of the face plate 26. The angle between the surfaces 106 and 108 shown in the drawing is exaggerated. This configuration or structure is known as a tapered-face seal. The operation of a seal of this type is fully described in the aforesaid patent. Briefly, the operation of the fluid shaft seal depends on the balance of hydrostatic pressure forces acting in the axial direction on the non-rotating seal assembly 18. The flow passage 112 between the face plate 26 and the rotating runner face plate 22 is constructed to provide a zero net axial force on the seal ring assembly only at the operating clearance. The deviation from the operating clearance changes the pressure distribution on the primary sealing face 106 on the face plate 26 so that the seal ring is moved back to the equilibrium position.

As explained hereinbefore, the leakage rate through the flow path 112 is a function of pressure, flow path and temperature. Thus, seals constructed in accordance with the prior art have a low leakage rate at low pressures and a higher leakage rate at high pressures. The seal arrangement herein disclosed is constructed to maintain a substantially constant leakage rate with varying pressures.

Figure 2:
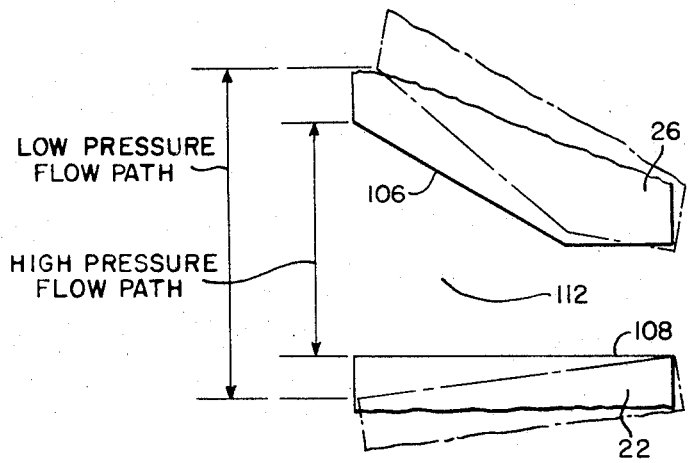
FIG. 2 is a diagrammatic view showing how the shape of the flow path through the seal changes with high and low pressure.

As explained hereinbefore the manner in which the face plates 26 and 22 are clamped to their respective holders 24 and 20 produces a deformation of the face plates about their respective fulcrums 94 and 104. This deformation is illustrated in an exaggerated condition by the dot-dash lines in FIG. 2. Thus, the shape of the flow path 112 is changed from that shown by the dot-dash lines at a low pressure to that shown by the solid lines at a high pressure.

Figure 3:
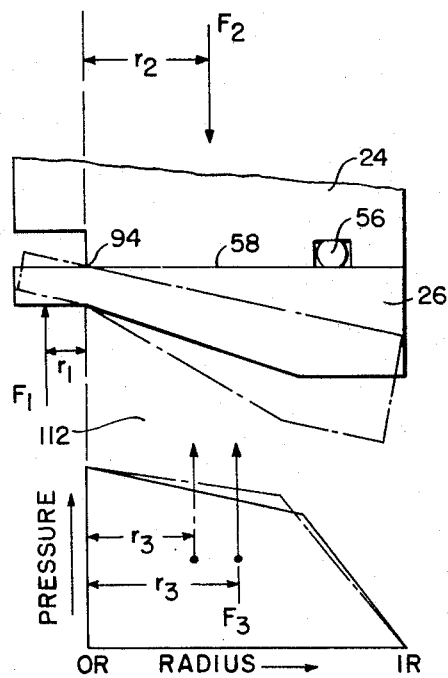
FIG. 3 is a diagrammatic view showing the pressure and clamping forces acting on members of the seal.

The manner in which the flow path is changed is illustrated in FIG. 3. This sketch shows how the forces on the face plate 26 of the seal ring assembly 18 change due to a change in flow path caused by pressure changes. $F_1$ is the clamping force and is constant. It has a moment arm $r_1$. $F_2$ is the force between the interface 58 of the holder 24 and the confronting interface of the face plate 26. The magnitude of $F_2$ changes with pressure but the moment arm $r_2$ stays the same. $F_3$ is the force produced by the pressure drop through the flow path 112. Above a certain pressure there is a moment produced by $F_3$ acting at a radius $r_3$ which is greater than the moments produced by $F_2$ and $F_1$. When this pressure is reached, the face plate is clamped solidly against the holder as shown in FIG. 3 and the flow path as shown with the solid lines in FIG. 2 now exists. This flow path produces a lower leakage rate than the flow path shown with the dot-dash lines.

Thus, at low pressures, a certain flow path is obtained which produces a desired leakage rate. As the pressure increases, the face plate is forced against the holder. The center of the presure force is also changing and gradually overcomes the clamping force as determined by the Belleville springs in the clamping means so that the face plate is deformed in the opposite direction. The flow path has therefore been changing along with the pressure so that a desired leakage rate now exists at high pressure as well as at low pressure.

As previously explained, the face plate 22 may be clamped to the holder 20 so that it is also deformed by the clamping means, but to a lesser degree than the deformation of the face plate 26. This is determined by the location of the fulcrum 104 for the face plate 22. Thus, the amount of change in the flow path 112 between the two face plates with a change in pressure is determined by the locations of the fulcrums for the face plates and the clamping force applied by the clamping means.

Since materials having similar coefficients of thermal expansion are used for the face plates and their holders, there is little effect on the leakage rate due to thermal transients. As previously stated, the holders are composed of a material having a high elastic modulus so that they have negligible deformation at high pressures. Deformation of the seal faces is permitted so as to provide a changing flow path with changing pressures. Thus, the invention provides a seal arrangement which maintains a substantially constant leakage rate at varying pressure and is virtually unattached by thermal transients.

Since numerous changes may be made in the above-described construction and different embodiments of the invention may be made without departing from the spirit and scope thereof, it is intended that all subject matter contained in the foregoing description or shown in the accompanying drawings shall be interpreted as illustrative and not in a limiting sense.

I claim as my invention:

1. In a fluid seal arrangement, in combination, a rotatable shaft, housing means having a wall thereon defining a fluid pressure chamber and receiving said shaft therein, a seal runner rotatable with the shaft, an annular seal face on the seal runner, an axially movable seal ring encircling the shaft and mounted in the housing means, said seal ring having an interface with an annular fulcrum thereon, an annular face plate having an interface confronting the interface on the seal ring and a seal face confronting the seal face on the runner, said seal faces being separable by axial movement of the seal ring, and clamping means attaching the face plate to the seal ring with a force exerting a cantilever effect on the face plate about said fulcrum in opposition to the pressure of fluid flowing from the pressure chamber through the space between the seal faces when separated.

2. The combination defined in claim 1, wherein the clamping means includes resilient means.

3. The combination defined in claim 1, including an annular seal member disposed in one of said interfaces.

4. The combination defined in claim 1, wherein the fulcrum is at the outside diameter of the interface on the seal ring.

5. The combination defined in claim 4, wherein the outside diameter of the interface on the face plate is greater than the diameter of the fulcrum.

6. A fluid seal arrangement for use with a rotatable shaft received in a housing having a wall defining a fluid pressure chamber, comprising a seal runner assembly rotatable with the shaft, an axially movable seal ring assembly encircling the shaft and mounted in the housing, means limiting rotative movement of the seal ring assembly, said seal runner assembly and said seal ring assembly each including an annular holder with an interface having an outside diameter defining an annular fulcrum and an annular face plate with an interface confronting the interface on the respective holder, said face plates having confronting seal faces separable by axial movement of the seal ring assembly, and clamping means attaching each face plate to its respective holder with a force exerting a cantilever effect on the face plate about the fulcrum on the holder in opposition to the pressure of fluid flowing from the pressure chamber through the space between the seal faces when separated.

7. The fluid seal arrangement of claim 6, wherein the outside diameter of the interface on each face plate is greater than the diameter of the fulcrum on its respective holder.

8. The fluid seal arrangement of claim 6, wherein the clamping means for each face plate includes a retainer ring having a flange engaging the face plate, a clamp ring having a flange engaging the holder for the face plate, a lock ring encircling the holder, and threaded means extending through the retainer ring and the clamp ring into the lock ring to draw the retainer ring and the clamp ring toward each other.

9. The fluid seal arrangement of claim 8, including Belleville springs mounted on the threaded means between the lock ring and the clamp ring.

10. The fluid seal arrangement of claim 6, wherein each face plate and its holder are composed of materials having substantially the same coefficient of thermal expansion.

References Cited

UNITED STATES PATENTS

| 2,761,711 | 9/1956 | Ecker | 277—91 |
| 2,761,712 | 9/1956 | Ecker | 277—91 |
| 2,814,512 | 11/1957 | Quinn et al. | 277—27 X |
| 3,144,253 | 8/1964 | Schirmer | 277—27 |
| 3,179,422 | 4/1965 | Phillips | 277—27 X |
| 3,347,552 | 10/1967 | Frisch | 227—27 |

SAMUEL ROTHBERG, Primary Examiner

U.S. Cl. X.R.

277—91